W. A. JACKSON & E. L. SHERBONDY.
ADJUSTABLE SHOE FOR AUTO TIRES.
APPLICATION FILED FEB. 14, 1912.
1,075,917.
Patented Oct. 14, 1913.
Fig. 1.
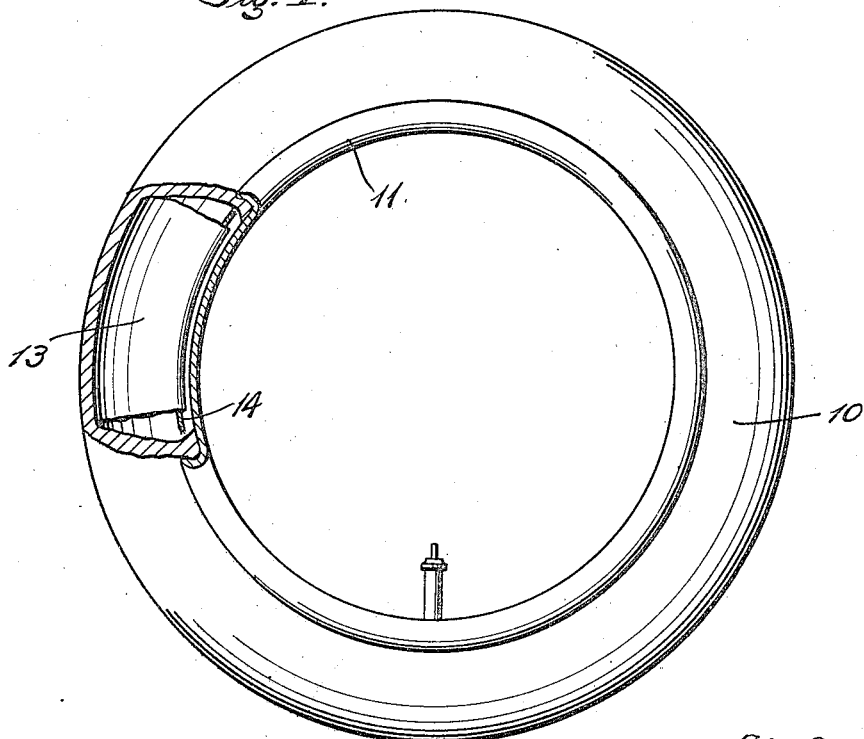
Fig. 5.
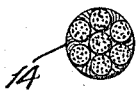
Fig. 2.
Fig. 6.
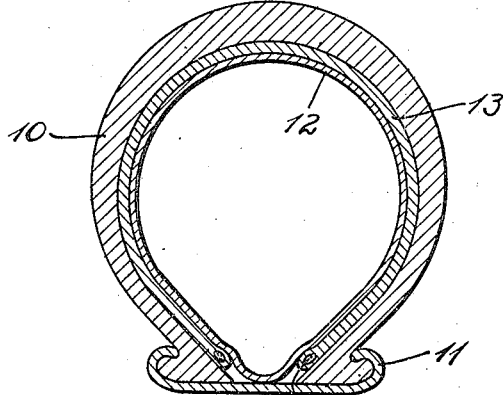
Fig. 3.
Fig. 4.
Witnesses.
E. R. Pollard
C. Severance
Inventors.
Walter A. Jackson
and Edward L. Sherbondy.
by
Howard Thurse
Attys.

UNITED STATES PATENT OFFICE.

WALTER A. JACKSON AND EDWARD L. SHERBONDY, OF LOS ANGELES, CALIFORNIA, ASSIGNORS OF ONE-THIRD TO GEORGE W. ENO, OF LOS ANGELES, CALIFORNIA.

ADJUSTABLE SHOE FOR AUTO-TIRES.

1,075,917.   Specification of Letters Patent.   Patented Oct. 14, 1913.

Application filed February 14, 1912. Serial No. 677,609.

*To all whom it may concern:*

Be it known that we, WALTER A. JACKSON and EDWARD L. SHERBONDY, citizens of the United States, residing at Los Angeles, in the county of Los Angeles and State of California, have invented new and useful Improvements in Adjustable Shoes for Auto-Tires, of which the following is a specification.

This invention relates to improvements in shoes for vehicle tires, and particularly to adjustable shoes for strengthening and preventing the blowing out of tires which have become somewhat weakened by use and wear.

It is an object of the invention to provide a shoe with a retaining edge cable or cord adapted to hold the said shoe in position surrounding the inner tube of a tire and within the outer casing thereof, the said cable being flattened to impart a yielding quality thereto and also to make it in such shape that it will lie flat in position.

It is a further object of the invention to provide a protecting shoe for auto tires with a woven wire cable inserted in the edges thereof, the said cable being flattened to draw it snugly into position and render it capable of yielding under pressure within a tire to perfectly conform to the size and shape thereof.

In the accompanying drawing forming a part of this specification, Figure 1 is a side elevation of an auto tire having a portion thereof broken away to show the adjustable shoe within the same. Fig. 2 is an enlarged transverse sectional view through such a tire with the shoe in place. Fig. 3 is a side elevation of a portion of the cable before it has been flattened. Fig. 4 is a side view of a portion of the cable used in the edges of the adjustable shoe after it has been flattened and looking at the broad side edge thereof. Fig. 5 is a transverse sectional view upon the line 5—5 of Fig. 3. Fig. 6 is a transverse sectional view of the cable on the line 6—6 of Fig. 4.

The details and features of the invention will now be more particularly described, reference being had to the said drawing in which 10 indicates a vehicle tire casing such as is commonly employed upon the wheels of automobiles, a rim 11 holding the same, being also shown. The tire shown is of the type ordinarily employing an inner tube 12 and between the said inner tube and the casing of the tire is the improved adjustable shoe 13. The edges of the shoe 13 are provided with holding cords or cables 14 which are incorporated in the material of the shoe at the edges thereof as clearly shown in Fig. 2. These cables are of such a diameter that when the casing is put in place they will be properly positioned upon the rim of the wheel and will form strong anchoring means for the shoe. The shoe 13 is of strong material such as is adapted to prevent the bulging of the tire at any place where the casing has become worn or injured or otherwise weakened.

A cable of any suitable style may be employed in the edge of the casing for holding it in place, but a cable possessing the proper strength would be so thick in diameter as to prevent the parts from being arranged flatly and in proper position upon each other within the tire. In accordance with the present invention the cable is made of woven strands of wire of a suitable thickness and strength and before incorporation in the edge of the shoe, the said cable is flattened as shown in Figs. 4 and 6 which tends to contract or shorten the length of the cable, the approximate difference between a flattened section and a corresponding length of cable before it is flattened being shown in Figs. 3 and 4.

The flattened and contracted form of cable placed in the edges of the shoe permit of the shoe being smoothly put into position and in such a way that the cables do not force or bulge inwardly the inner tube to any appreciable degree. The collapsing of the cable also provides for a certain amount of elasticity therein, so that when the tire is inflated after the shoe has been put in position, the stretching thereof will tend to stretch the cable and the shoe will fit absolutely smoothly in place. The shortening of the cable by flattening it, thus makes an elastic cord fastening at the edges of the shoe.

What we claim is:

A shoe for pneumatic tires, comprising an annular body substantially tubular in form with two annular edges, and a flattened wire cable of an initial cylindrical form secured in each annular edge of the annular body, whereby when the shoe is in place in relation to a tire and air is forced therein to inflate the tire, the flattened cables are capable of yielding under pressure to permit the shoe to conform to the inner surface of the casing.

In witness that we claim the foregoing we have hereunto subscribed our names this 2nd day of February, 1912.

WALTER A. JACKSON.
E. L. SHERBONDY.

Witnesses:
E. STADTMAN,
EARLE R. POLLARD.